US012307382B1

(12) United States Patent
Manzoor et al.

(10) Patent No.: US 12,307,382 B1
(45) Date of Patent: May 20, 2025

(54) NEURAL TAXONOMY EXPANDER

(71) Applicant: Pinterest, Inc., San Francisco, CA (US)

(72) Inventors: Emaad Ahmed Manzoor, Pittsburgh, PA (US); Rui Li, San Jose, CA (US); Dhananjay Shrouty, San Francisco, CA (US); Jurij Leskovec, Stanford, CA (US)

(73) Assignee: Pinterest, Inc., San Francisco, CA (US)

( * ) Notice: Subject to any disclaimer, the term of this patent is extended or adjusted under 35 U.S.C. 154(b) by 1383 days.

(21) Appl. No.: 16/592,115

(22) Filed: Oct. 3, 2019

(51) Int. Cl.
*G06N 5/022* (2023.01)
*G06N 3/04* (2023.01)
*G06N 3/08* (2023.01)

(52) U.S. Cl.
CPC .............. *G06N 5/022* (2013.01); *G06N 3/04* (2013.01); *G06N 3/08* (2013.01)

(58) Field of Classification Search
CPC ............. G06N 5/022; G06N 3/04; G06N 3/08
See application file for complete search history.

(56) References Cited

U.S. PATENT DOCUMENTS

2019/0325342 A1* 10/2019 Sikka ............... G06V 30/19173
2020/0074246 A1* 3/2020 Goyal .................. G06K 9/6274

OTHER PUBLICATIONS

Shi, Y., Shen, J., Li, Y., Zhang, N., He, X., Lou, Z., . . . & Han, J. (2019). Discovering Hypernymy in Text-Rich Heterogeneous Information Network by Exploiting Context Granularity. arXiv preprint arXiv:1909.01584. (Year: 2019).*
Luu, A. T., Tay, Y., Hui, S. C., & Ng, S. K. (Nov. 2016). Learning term embeddings for taxonomic relation identification using dynamic weighting neural network. In Proceedings of the 2016 Conference on Empirical Methods in Natural Language Processing (pp. 403-413). (Year: 2016).*
You, J., Ying, R., & Leskovec, J. (2019). Position-aware Graph Neural Networks. arXiv e-prints, arXiv-1906. (Year: 2019).*
Shen, Z., Ma, H., & Wang, K. (2018). A web-scale system for scientific knowledge exploration. arXiv preprint arXiv: 1805.12216. (Year: 2018).*

(Continued)

*Primary Examiner* — David Yi
*Assistant Examiner* — Leonard A Sieger
(74) *Attorney, Agent, or Firm* — Athorus, PLLC

(57) ABSTRACT

Systems and methods for automatically placing a taxonomy candidate within an existing taxonomy are presented. More particularly, a neural taxonomy expander (a neural network model) is trained according to the existing, curated taxonomic hierarchy. Moreover, for each node in the taxonomic hierarchy, an embedding vector is generated. A taxonomy candidate is received, where the candidate is to be placed within the existing taxonomy. An embedding vector is generated for the candidate and projected by a projection function of the neural taxonomy expander into the taxonomic hyperspace. A set of closest neighbors to the projected embedding vector of the taxonomy candidate is identified and the closest neighbor of the set is assumed as the parent for the taxonomy candidate. The taxonomy candidate is added to the existing taxonomic hierarchy as a child to the identified parent node.

20 Claims, 7 Drawing Sheets

(56) References Cited

OTHER PUBLICATIONS

Zhang, X., Chen, Y., Chen, J., Du, X., Wang, K., & Wen, J. R. (Aug. 2017). Entity set expansion via knowledge graphs. In Proceedings of the 40th International ACM SIGIR Conference on Research and Development in Information Retrieval (pp. 1101-1104). (Year: 2017).*
McFee, B., & Lanckriet, G. R. (2010, January). Metric learning to rank. In ICML. (Year: 2010).*
McFee et al., "Metric Learning to Rank", 2010, Proceedings of the 27th International Conference on Machine Learning, vol. 27 (2010 ), pp. 1-8 (Year: 2010).*
Zhang et al., "TaxoGen: Unsupervised Topic Taxonomy Construction by Adaptive Term Embedding and Clustering", 2018, In Proceedings of the 24th ACM SIGKDD International Conference on Knowledge Discovery & Data Mining, vol. 2018, pp. 2701-2709 ( Year: 2018).*
Qu et al., "Weakly-supervised Relation Extraction by Pattern-enhanced Embedding Learning", 2018, Proceedings of the 2018 World Wide Web Conference, vol. 2018, pp. 1257-1266 (Year: 2018).*
Qu et al., "Probabilistic Logic Neural Networks for Reasoning", Jun. 20, 2019, arXiv, v1906.08495v1, pp. 1-10 (Year: 2019).*
Shen et al., "HiExpan: Task-Guided Taxonomy Construction by Hierarchical Tree Expansion", 2018, Proceedings of the 24th ACM SIGKDD International Conference on Knowledge Discovery & Data Mining, vol. 24(2018), pp. 2180-2189 (Year: 2018).*
Shi et al., "ProjE: Embedding Projection for Knowledge Graph Completion", 2017, Proceedings of the AAAI Conference on Artificial Intelligence, vol. 31(1), pp. 1236-1242 (Year: 2017).*
Shi et al., "Discovering Hypernymy in Text-Rich Heterogeneous Information Network by Exploiting Context Granularity", Sep. 4, 2019 , arXiv, v1909.01584v1, pp. 1-10 (Year: 2019).*
Pennington, J., Socher, R. and Manning, C. 2014. Glove: Global Vectors for Word Representation. In EMNLP. https://hlp.stanford.edu/pubs/glove.pdf.
Perozzi, B., Al-Rfou, R. and Skiena, S. 2014. Deepwalk: Online Learning of Social Representations. In KDD. http://perozzi.net/publications/14_kdd_deepwalk.pdf.
Roller, S., Erk, K. and Boleda, G. 2014. Inclusive yet Selective: Supervised Distributional Hypemymy Detection. In COLING. http://www.cs.utexas.edu/users/ml/papers/roller.coling14.pdf.
Sala, F., De Sa, C., Gu, A. and Ré, C. 2018. Representation Tradeoffs for Hyperbolic Embeddings. In ICML. http://proceedings.mlr.press/v80/sala18a/sala18a.pdf.
Schroff, F., Kalenichenko, D. and Philbin, J. 2015. Facenet: A Unified Embedding for Face Recognition and Clustering. In CVPR. http://openaccess.thecvf.com/content_cvpr_2015/papers/Schroff_FaceNet_A_Unified_2015_CVPR_paper.pdf.
Shaw, B. and Jebara, T. 2009. Structure Preserving Embedding. In ICML. http://www.cs.columbia.edu/~jebara/papers/spe-icml09.pdf.
Shaw, B., Huang, B., and Jebara, T. 2011. Learning a Distance Metric from A Network. In NIPS. http://www.cs.columbia.edu/~jebara/papers/metricfromnetwork.pdf.
Shen, J., Wu, Z., Lei, D., Zhang, C., Ren, X., Vanni, M.T., Sadler, B.M. and Han, J. 2018. HiExpan: Task-Guided Taxonomy Construction by Hierarchical Tree Expansion. In SIGKDD. http://hanj.cs.illinois.edu/pdf/kdd18_jshen.pdf.
Shwartz, V., Goldberg, Y. and Dagan, I. 2016. Improving Hypernymy Detection with an Integrated Path-Based and Distributional Method. arXiv preprint arXiv:1603.06076 (2016). https://www.aclweb.org/anthology/P16-1226.pdf.
Snow, R., Jurafsky, D. and Ng, A.Y. 2005. Learning Syntactic Patterns for Automatic Hypernym Discovery. In NIPS. http://ai.stanford.edu/~rion/papers/hypernym_nips05.pdf.
Socher, R., Chen, D., Manning, C.D. and Ng, A. 2013. Reasoning with Neural Tensor Networks for Knowledge Base Completion. In NIPS. https://nlp.stanford.edu/pubs/SocherChenManningNg_NIPS2013.pdf.

Speer, R., Chin, J. and Havasi, C. 2017. ConceptNet 5.5: An Open Multilingual Graph of General Knowledge. In AAAI. https://tianjun.me/static/essay_resources/Introduction_to_ConceptNet/ConceptNet%205.5%20An%20Open%20Multilingual%20Graph%20of%20General%20Knowledge.pdf.
Tang, J., Qu, M., Wang, M., Zhang, M., Yan, J. and Mei, Q. 2015. Line: Large-Scale Information Network Embedding. In WWW. 1067-1077. http://www.www2015.it/documents/proceedings/proceedings/p1067.pdf.
Trouillon, T., Welbl, J., Riedel, S., Gaussier, E. and Bouchard, G. 2016. Complex Embeddings for Simple Link Prediction. In ICML. http://proceedings.mlr.press/v48/trouillon16.pdf.
Ustalov, D., Arefyev, N., Biemann, C. and Panchenko, A. 2017. Negative Sampling Improves Hypernymy Extraction Based on Projection Learning. arXiv preprint arXiv:1707.03903 (2017).https://arxiv.org/pdf/1707.03903.pdf.
Vendrov, I., Kiros, R., Fidler, S. and Urtasun, R. 2015. Order-Embeddings of Images and Language. arXiv preprint arXiv:1511.06361 (2015). https://arxiv.org/pdf/1511.06361v3.pdf.
Verma, N., Mahajan, D., Sellamanickam, S. and Nair, V. 2012. Learning Hierarchical Similarity Metrics. In CVPR. http://www.cs.toronto.edu/~vnair/cvpr12.pdf.
Vilnis, L. and McCallum, A. 2015. Word Representations via Gaussian Embedding. In ICLR. https://arxiv.org/pdf/1412.6623v3.pdf.
Vilnis, L., Li, X., Murty, S. and McCallum, A. 2018. Probabilistic Embedding of Knowledge Graphs with Box Lattice Measures. arXiv preprint arXiv:1805.06627 (2018). https://arxiv.org/pdf/1805.06627.pdf.
Vulic, I., Glavaš, G., Mrkšić, N. and Korhonen, A. 2018. Post-Specialisation: Retrofitting Vectors of Words Unseen in Lexical Resources. arXiv preprint arXiv:1805.03228 (2018).https://arxiv.org/pdf/1805.03228.pdf.
Wang, C., He, X. and Zhou, A. 2017. A Short Survey on Taxonomy Learning from Text Corpora: Issues, Resources and Recent Advances. In EMNLP. https://chywang.github.io/papers/emnlp2017b.pdf.
Wang, J., Zhou, S., Wang, J. and Hou, Q. 2018. Deep Ranking Model by Large Adaptive Margin Learning for Person Re-Identification. Pattern Recognition (2018).
Weeds, J., Clarke, D., Reffin, J., Weir, D. and Keller, B. 2014. Learning to Distinguish Hypernyms and Co-Hyponyms. In COLING. https://www.researchgate.net/profile/Jeremy_Reffin/publication/273103581_Learning_to_Distinguish_Hypernyms_and_Co-Hyponyms/links/54f6f0820cf21d8b8a5f1ba8/Learning-to-Distinguish-Hypernyms-and-Co-Hyponyms.pdf?origin=publication_detail.
Weinberger, K.Q. and Chapelle, O. 2009. Large Margin Taxonomy Embedding for Document Categorization. In NIPS. https://www.researchgate.net/profile/Kilian_Weinberger/publication/228633511_Large_Margin_Taxonomy_Embedding_with_an_Application_to_Document_Categorization/links/0fcfd50aa6de91b1f9000000/Large-Margin-Taxonomy-Embedding-with-an-Application-to-Document-Categorization.pdf?origin=publication_detail.
Weinberger, K.Q. and Saul, L.K. 2009. Distance Metric Learning for Large Margin Nearest Neighbor Classification. UMLR (2009). http://jmlr.csail.mit.edu/papers/volume10/weinberger09a/weinberger09a.pdf.
Wu, C-Y, Manmatha, R, Smola, A.J. and Krahenbuhl, P. 2017. Sampling Matters in Deep Embedding Learning. In CCV. https://arxiv.org/pdf/1706.07567v1.pdf.
Xing, E.P., Jordan, M.I., Russell, S.J. and Ng, A.Y. 2003. Distance Metric Learning with Application to Clustering with Side-Information. In NIPS. http://citeseer.ist.psu.edu/viewdoc/download;jsessionid=AB5B7097335BD16DC13909B2D707DOFB?doi=10.1.1.2.6509&rep=rep1&type=pdf.
Yamane, J., Takatani, T., Yamada, H., Miwa, M. and Sasaki, Y. 2016. Distributional Hypernym Generation by Jointly Learning Clusters and Projections. In COLING. https://www.aclweb.org/anthology/C16-1176.pdf.
Yang, H. and Callan, J. 2009. A Metric-Based Framework for Automatic Taxonomy Induction. In ACL. http://www.cs.cmu.edu/~callan/Papers/acl09-huiyang.pdf.

(56) References Cited

OTHER PUBLICATIONS

Yu, Z., Wang, H., Lin, X. and Wang, M. 2015. Learning Term Embeddings for Hypernymy Identification. In IJCAI. https://www.ijcai.org/Proceedings/15/Papers/200.pdf.

Zhang, C., Tao, F., Chen, X., Shen, J., Jiang, M., Sadler, B., Vanni, M. and Han, J. 2018. Taxogen: Unsupervised Topic Taxonomy Construction by Adaptive Term Embedding and Clustering. In SIGKDD. https://research.fb.com/wp-content/uploads/2018/08/TaxoGen-Unsupervised-Topic-Taxonomy-Construction-by-Adaptive-Term-Embedding-and-Clustering.pdf.

Zhang, Y., Ahmed, A., Josifovski, V. and Smola, A. 2014. Taxonomy Discovery for Personalized Recommendation. In WSDM. https://zhangyuc.github.io/files/zhang14wsdm.pdf.

Zhuang, J. and Liu, Y. 2019. PinText: A Multitask Text Embedding System in Pinterest. In KDD. https://dl.acm.org/doi/pdf/10.1145/3292500.3330671?download=true.

Ziegler, C-N, Lausen, G., and Schmidt-Thieme, L. 2004. Taxonomy-Driven Computation of Product Recommendations. In CIKM. https://www.researchgate.net/profile/Cai-Nicolas_Ziegler/ publication/200121010_Taxonomy-driven_Computation_of_Product_Recommendations/links/0fcfd510f5c1e6abcd000000/Taxonomy-driven-Computation-of-Product-Recommendations.pdf?origin=publication_detail.

Agrawal, R., Gollapudi, S., Halverson, A. and Ieong, S. 2009. Diversifying Search Results. In WSDM.

Ahmed, N.K., Rossi, R., Lee, J.B., Willke, T.L., Zhou, R., Kong, X. and Eldardiry, H. 2018. Learning Role-based Graph Embeddings. arXiv preprint arXiv:1802.02896 (2018).

Aly, R., Acharya, S., Ossa, A., Kohn, A., Biemann, C. and Panchenko, A. 2019. Every Child Should Have Parents: A Taxonomy Refinement Algorithm Based on Hyperbolic Term Embeddings. In ACL.

Anh Tuan, .L., Tay, Y., Hui, S.C. and Ng, S.K. 2016. Learning Term Embeddings for Taxonomic Relation Identification Using Dynamic Weighting Neural Network. In EMNLP. 403-413.

Babbar, R., Partalas, I., Gaussier, E. and Amini, M.R. 2013. On Flat Versus Hierarchical Classification in Large-scale Taxonomies. In NIPS. http://papers.nips.cc/paper/5082-on-flat-versus-hierarchical-classification-in-large-scale-taxonomies.pdf.

Babbar, R., Partalas, I., Gaussier, E. and Amini, M-R, and Amblard, C. 2016. Learning Taxonomy Adaptation in Large- scale Classification. JMLR (2016). http://jmlr.org/papers/volume17/14-207/14-207.pdf.

Bansal, M., Burkett, D., De Melo, G. and Klein, D. 2014. Structured Learning for Taxonomy Induction with Belief Propagation. In ACL. https://www.researchgate.net/publication/270877287_Structured_Learning_for_Taxonomy_Induction_with_Belief_Propagation.

Baroni, M., Bernardi, R., Do, N-Q, and Shan, C-C. 2012. Entailment Above the Word Level in Distributional Semantics. In EACL. https://www.researchgate.net/publication/228438454_Entailment_above_the_word_level_in_distributional_semantics.

Bernier-Colborne, G. and Barriere, C. 2018. CRIM at SemEval-2018 Task 9: A Hybrid Approach to Hypernym Discovery. In Proceedings of the 12th International Workshop on Semantic Evaluation. https://www.aclweb.org/anthology/S18-1116.pdf.

Bojanowski, P., Grave, E., Joulin, A. and Mikolov, T. 2017. Enriching Word Vectors with Subword Information. TACL (2017). https://www.mitpressjournals.org/doi/pdfplus/10.1162/tacl_a_00051.

Bordes, A., Usunier, N., Garcia-Duran, A., Weston, J., and Yakhnenko, O. 2013. Translating Embeddings for Modeling Multi-relational Data. In NIPS. http://papers.nips.cc/paper/5071-translating-embeddings-for-modeling-multi-relational-data.pdf.

Camacho-Collados, J., Delli Bovi, C., Anke, L.E., Oramas, S., Pasini, T., Santus, E., Shwartz, V., Navigli, R., and Saggion, H. 2018. SemEval-2018 task 9: Hypernym Discovery. In Proceedings of the 12th International Workshop on Semantic Evaluation. https://www.researchgate.net/publication/325448777_SemEval-2018_Task_9_Hypernym_Discovery.

Dekel, O., Keshet, J., and Singer, Y. 2004. Large Margin Hierarchical Classification. In ICML.https://oferdekel.github.io/pdf/2004DekelKeSi.pdf.

Dong, T., Bauckhage, C., Jin, H., Li, J., Cremers, O., Speicher, D., Cremers, A.B., and Zimmermann, J. 2018. Imposing Category Trees onto Word-Embeddings Using a Geometric Construction. (2018). https://www.researchgate. net/publication/331319652_Imposing_Category_Trees_Onto_Word-Embeddings_Using_A_Geometric_Construction.

Donnat, C., Zitnik, M., Hallac, D., and Leskovec, J. 2018. Learning Structural Node Embeddings via Diffusion Wavelets. In KDD. https://cs.stanford.edu/~jure/pubs/graphwave-kdd18.pdf.

Eksombatchai, C., Jindal, P., Liu, J.Z., Liu, Y., Sharma, R., Sugnet, C., Ulrich, M. and Leskovec, J. 2018. Pixie: A System for Recommending 3+ Billion Items to 200+ Million Users in Real-Time. In WWW. https://cs.stanford.edu/people/jure/pubs/pixie-www18.pdf.

Espinosa-Anke, L., Camacho-Collados, J., Delli Bovi, C., and Saggion, H. 2016. Supervised Distributional Hypernym Discovery via Domain Adaptation. In EMNLP. https://www.researchgate.net/publication/309726823_Supervised_Distributional_Hypernym_Discovery_via_Domain_Adaptation.

Feng, Y., Wang, H., Yi, D.T. and Hu, R.2019. Triplet Distillation for Deep Face Recognition. https://arxiv.org/pdf/1905.04457.pdf (2019).

Figueiredo, D.R., Ribeiro, L.FR, and Saverese, P.HP, 2017. struc2vec: Learning Node Representations from Structural Identity. In KDD. https://arxiv.org/pdf/1704.03165v1.pdf.

Fu, R., Guo, J., Qin, B., Che, W., Wang, H. and Liu, T. 2014. Learning Semantic Hierarchies via Word Embeddings. In ACL. http://ir.hit.edu.cn/~jguo/papers/acl2014-hypernym.pdf.

Ganea, O-E, Bécigneul, G. and Hofmann, T. 2018. Hyperbolic Entailment Cones for Learning Hierarchical Embeddings. https://arxiv.org/pdf/1804.01882.pdf (2018).

Geffet, M. and Dagan, I. 2005. The Distributional Inclusion Hypotheses and Lexical Entailment. In ACL. http://ssli.ee.washington.edu/conferences/ACL2005/ACL/pdf/ACL14.pdf.

Gonçalves, R.S., Horridge, M., Li, R., Liu, Y., Musen, M.A., Nyulas, C.I., Obamos, E., Shrouty, D., and Temple, D. 2019. Use of OWL and Semantic Web Technologies at Pinterest. https://arxiv.org/pdf/1907.02106.pdf(2019).

Grover, A. and Leskovec, J. 2016. node2vec: Scalable Feature Learning for Networks. In KDD.

He, R., Lin, C., Wang, J. and McAuley, J. 2016. Sherlock: Sparse Hierarchical Embeddings for Visually-Aware One-Class Collaborative Filtering. In AAAI. https://cseweb.ucsd.edu/~jmcauley/pdfs/ijcai16.pdf.

Hearst, M.A. 1992. Automatic Acquisition of Hyponyms from Large Text Corpora. In ACL. https://www.aclweb.org/anthology/C92-2082.pdf.

Huang, J., Ren, Z., Zhao, W.X., He, G., Wen, J-R, and Dong, D. 2019. Taxonomy-Aware Multi-Hop Reasoning Networks for Sequential Recommendation. In WSDM.

Kanagal, B., Ahmed, A., Pandey, S., Josifovski, V., Yuan, J. and Garcia-Pueyo, L. 2012. Supercharging Recommender Systems Using Taxonomies for Learning User Purchase Behavior. VLDB (2012). http://vldb.org/pvldb/vol5/p956_bhargavkanagal_vldb2012.pdf.

Kingma, D.P. and Ba, J. 2014. Adam: A Method for Stochastic Optimization. arXiv preprint arXiv:1412.6980 (2014). https://arxiv.org/pdf/1412.6980v1.pdf.

Laha, A., Chemmengath, S.A., Agrawal, P., Khapra, M., Sankaranarayanan, K. and Ramaswamy, H.G. 2018. On Controllable Sparse Alternatives to Softmax. In NIPS. https://arxiv.org/pdf/1810.11975.pdf.

Levy, O., Remus, S., Biemann, C. and Dagan, I. 2015. Do Supervised Distributional Methods Really Learn Lexical Inference Relations? In NAACL-HLT. https://www.aclweb.org/anthology/N15-1098.pdf.

Li, X., Vilnis, L., Zhang, D., Boratko, M. and McCallum, A. 2018. Smoothing the Geometry of Probabilistic Box Embeddings. (2018). https://openreview.net/pdf?id=H1xSNiRcF7.

Lim, D. and Lanckriet, G. 2014. Efficient Learning of Mahalanobis Metrics for Ranking. In ICML.http://proceedings.mlr.press/v32/lim14.pdf.

Liu, D., Rogers, S., Shiau, R., Kislyuk, D., Ma, K.C., Zhong, Z., Liu, J. and Jing, Y. 2017. Related Pins at Pinterest: The Evolution of a Real-World Recommender System. In WWW. https://arxiv.org/pdf/1702.07969v1.pdf.

(56) References Cited

OTHER PUBLICATIONS

Liu, N., Huang, X., Li, J. and Hu, X. 2018. On Interpretation of Network Embedding Via Taxonomy Induction. In KDD. http://www.public.asu.edu/~jundongl/paper/KDD18_Network_Embedding_Interpretation.pdf.

Mao, Y., Ren, X., Shen, J., Gu, X. and Han, J. 2018. End-to-End Reinforcement Learning for Automatic Taxonomy Induction. In SDM. https://arxiv.org/pdf/1805.04044.pdf.

Martins, A. and Astudillo, R. 2016. From Softmax to Sparsemax: A Sparse Model of Attention and Multi-Label Classification. In ICML. https://arxiv.org/pdf/1602.02068v2.pdf.

McCallum, A., Rosenfeld, R., Mitchell, T.M. and Ng, A.Y. 1998. Improving Text Classification by Shrinkage in a Hierarchy of Classes. In ICML. https://pdfs.semanticscholar.org/f267/1b151fad7e176176b35d425b2b6356ff4595.pdf?_ga=2.165304895.1417642735.1577756480-1985355348.1527123823.

McFee, B. and Lanckriet, G.R. 2010. Metric Learning to Rank. In ICML. https://bmcfee.github.io/papers/mlr.pdf.

Menon, A.K., Chitrapura, K-P, Garg, S., Agarwal, D. and Kota, N. 2011. Response Prediction Using Collaborative Filtering with Hierarchies and Side-Information. In KDD. http://ideal.ece.utexas.edu/courses/ee381_addm/kdd2011/p141.pdf.

Mikolov, T., Sutskever, I., Chen, K., Corrado, G.S. and Dean, J. 2013. Distributed Representations of Words and Phrases and Their Compositionality. In NIPS. https://arxiv.org/pdf/1310.4546.pdf.

Mikolov, T., Yih, W-T and Zweig, G. 2013. Linguistic Regularities in Continuous Space Word Representations. In NAACL-HLT. https://www.microsoft.com/en-us/research/wp-content/uploads/2016/02/rvecs.pdf.

Miller, G.A. 1995. WordNet: A Lexical Database for English. CACM (1995). http://12r.cs.uiuc.edu/Teaching/CS598-05/Papers/miller95.pdf.

Mirzazadeh, F., Guo, Y. and Schuurmans, D. 2014. Convex Co-Embedding. In AAAI. https://researcher.watson.ibm.com/researcher/files/IBM-Farzaneh/14_aaai14paper.pdf.

Navigli, R. and Velardi, P. 2010. Learning Word-Class Lattices for Definition and Hypernym Extraction. In ACL.https://www.aclweb.org/anthology/P10-1134.pdf.

Nguyen, K.A., Koper, M. Schulte im Walde, S., and Vu, N.T. 2017. Hierarchical Embeddings For Hypernymy Detection and Directionality. arXiv preprint arXiv:1707.07273 (2017).https://arxiv.org/pdf/1707.07273.pdf.

Nickel, M. and Kiela, D. 2017. Poincare Embeddings for Learning Hierarchical Representations. In NIPS. https://arxiv.org/pdf/1705.08039.pdf.

Nickel, M. and Kiela, D. 2018. Learning Continuous Hierarchies in the Lorentz Model of Hyperbolic Geometry. In ICML. https://arxiv.org/pdf/1806.03417.pdf.

Nickel, M., Rosasco, L. and Poggio, T. 2016. Holographic Embeddings of Knowledge Graphs. In AAAI. https://cbmm.mit.edu/sites/default/files/publications/1510.04935v2.pdf.

Paccanaro, A. and Hinton, G.E. 2002. Learning Hierarchical Structures with Linear Relational Embedding. In NIPS. http://papers.nips.cc/paper/2068-learning-hierarchical-structures-with-linear-relational-embedding.pdf.

\* cited by examiner

US 12,307,382 B1

NEURAL TAXONOMY EXPANDER

BACKGROUND

Taxonomy is the science of defining groups. Elements of a taxonomy are typically located within a hierarchical organization on the basis of shared characteristics, and also names given to those groups. Traditionally, the general concept of a "taxonomy" was focused on the placement of biological organisms into a general hierarchy. The organisms are grouped together into taxa (singular: taxon) and these groups are given a taxonomic rank. Groups of a given rank can be aggregated to form a super group of higher rank, thus creating a taxonomic hierarchy.

Whether it is a matter of overloading the term "taxonomy", or a matter of co-opting the general idea of taxonomy, the notion of taxonomy is frequently used in the context of computers. One particular use, and the general subject of the disclosed subject matter, is a topic or concept taxonomy, where specific items or topics are grouped into a hierarchy of items or topics. In the context of an online recommender service (generally, an online service that recommends items to a computer user based on that user's actions), understanding the context of a computer user's actions in view of a topic taxonomy, especially to items or things, significantly enhances the ability of a recommender service to recommend items that are of likely interest to that user.

Unfortunately, just as classifying a biological organism into a traditional taxonomy is difficult, time-expensive and requires substantial human-curation activity, so too is the online use of taxonomies, especially when it comes to adding an item into an existing topical taxonomy at the correct location in the hierarchy.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

According to aspects of the disclosed subject matter, systems and methods for automatically placing a taxonomy candidate within an existing taxonomy of items and things are presented. More particularly, a neural taxonomy expander (i.e., a neural network model) is trained according to an existing, curated taxonomic hierarchy of items and things. For each node in the taxonomic hierarchy, an embedding vector is generated. A taxonomy candidate c is received, wherein the candidate is to be placed within the existing taxonomy. An embedding vector is generated for the candidate and projected by a projection function of the trained neural taxonomy expander into the taxonomic hyperspace. A set of closest neighbors to the projected embedding vector of the taxonomy candidate is identified and, from the set of closest neighbors, a closest neighbor of the set is assumed as the likely parent for the taxonomy candidate c. The taxonomy candidate c is added to the existing taxonomic hierarchy as a child to the identified parent node.

For purposes of clarity and by way of definition, the term "exemplary," as used in this document, should be interpreted as serving as an illustration or example of something, and it should not be interpreted as an ideal or leading illustration of that thing. Stylistically, when a word or term is followed by "(s)", the meaning should be interpreted as indicating the singular or the plural form of the word or term, depending on whether there is one instance of the term/item or whether there is one or multiple instances of the term/item. For example, the term "user(s)" should be interpreted as one or more users. Moreover, the use of the combination "and/or" with multiple items should be viewed as meaning either or both items.

By way of definition, the terms "taxonomy" and "taxonomic hierarchy" are used interchangeably. Each refers to the directed, acyclical arrangement of nodes within a graph showing the taxonomic relationship of parents to children, where child nodes are a type of their parent node, but parent nodes are not a type of any of its child nodes.

Figure 1:
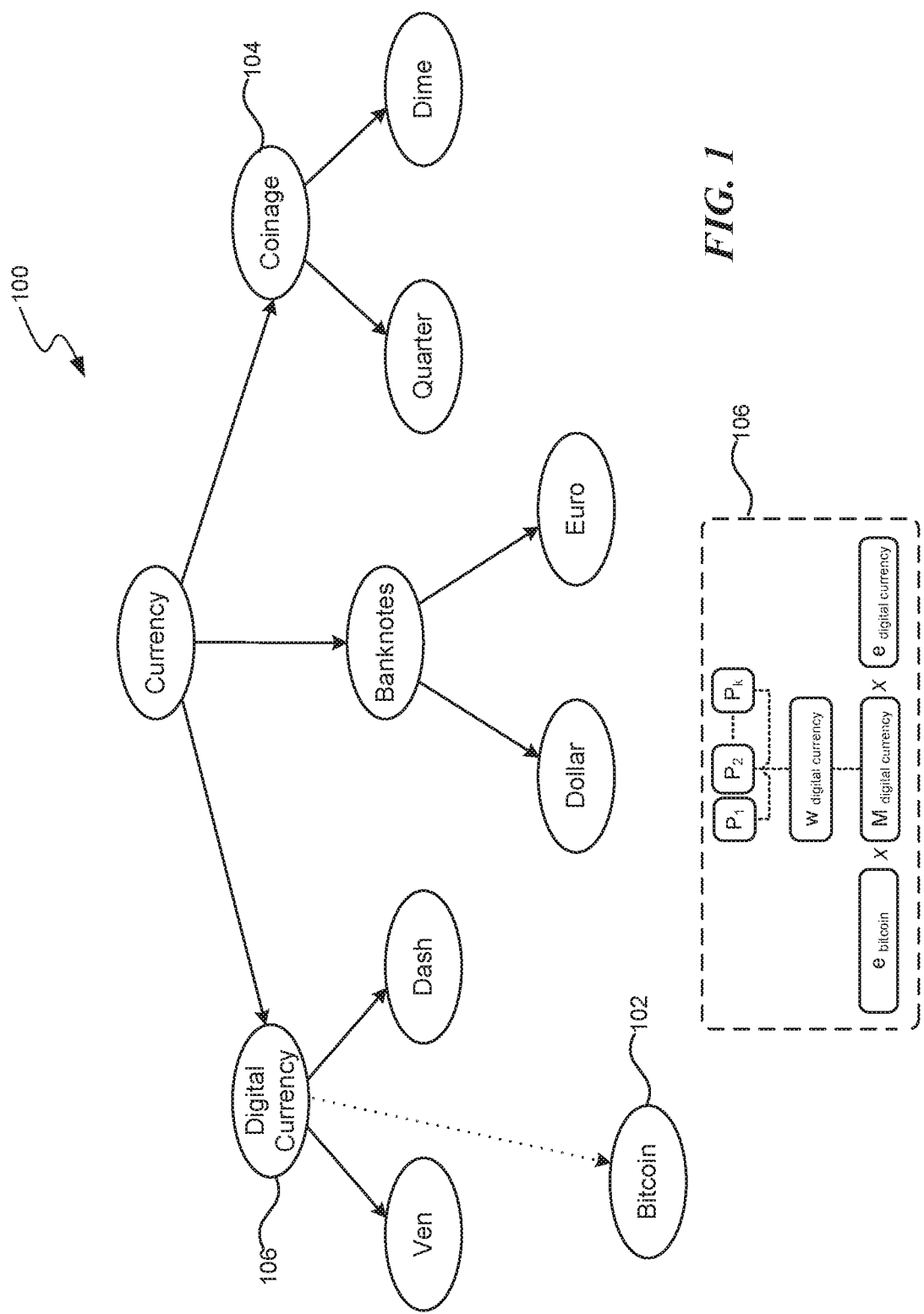
FIG. 1 is a block diagram illustrating an exemplary segment of a taxonomic hierarchy, suitable for describing aspects of the disclosed subject matter.

As indicated above, identifying the proper location of a new item (i.e., a taxonomy candidate c) within the hierarchy of an existing taxonomy has historically been a human-curated, time-intensive activity. By way of description and turning to the figures, FIG. 1 is a block diagram illustrating an exemplary segment of a taxonomy 100, suitable for describing aspects of the disclosed subject matter. In this example, a new item 102 (i.e., a taxonomy candidate for the existing hierarchy), corresponding to "Bitcoin," is presented for inclusion within the taxonomy. Without knowing more, simply based on the name of the new item, "Bitcoin", and textual content relating to taxonomy node 104, "Coinage," the textual similarities might conclude that it makes the most sense to include the new item 102 as a child of node 104. Of course, knowing that Bitcoin is a form of digital currency, the correct parent for this new item 102 is more likely item 106, "Digital Currency." The question becomes, how can taxonomy expansion, i.e., adding a candidate item to a correct location within an existing taxonomy, be programmatically achieved?

According to aspects of the disclosed subject matter, for a given taxonomy candidate c, i.e., where taxonomy candidate c is a new item to be added to an existing taxonomic hierarchy T, textual content regarding the candidate c is aggregated and an embedding vector $e_c$ is generated from the aggregated textual content. According to various embodiments, the embedding vector $e_c$ may be generated by any one of established text-based embedding vector generators, such as FastText and ConceptNet, though proprietary embedding vector generators may also be utilized.

A neural taxonomy expander is then used to project the embedding vector $e_c$ into taxonomic hyperspace for the existing taxonomic hierarchy T. The neural taxonomy expander is trained to project the embedding vector $e_q$ into a taxonomic hyperspace, resulting in projection $p_c$. This projection $p_c$ of the embedding vector $e_c$ is carried out in view of a projection tensor $\phi$ containing a plurality of projection matrices, the values of each projection tensor having been determined in the training of the neural taxonomy expander. After projecting the taxonomy candidate c into the taxonomic hyperspace, a set of hypernyms (parent nodes) is identified, where the set includes those nodes of the existing taxonomy T whose embedding vector $e_h$ is closest to the projected taxonomy candidate $p_c$ within the taxonomic hyperspace. In various embodiments, this set of hypernyms is an ordered set according to their proximity to the projected query $p_c$ in the taxonomic hyperspace. Typically, the closest hypernym is selected as the parent node for the taxonomy candidate c. Additional description of this process is set forth below.

According to additional aspects of the disclosed subject matter and as indicated above, the neural taxonomy expander is trained in view of an existing taxonomy T. In training the neural taxonomy expander and according to aspects of the disclosed subject matter, positive candidate/hypernym pairs {x, h} are generated from the existing taxonomy T. Additionally, in order to compensate for over-favoritism in training, negative candidate/hypernym pairs {x, h'}, where the provided hypernym h' is not the parent of the provided candidate x, are generated in proportion to the number of child nodes of a given hypernym. These pairs, both positive and negative candidate/hypernym pairs, are randomly divided into training and validation sets. Per the discussion above, child nodes and hypernyms are projected into the hyperspace, with the embedding vector of the child node x being projecting via the projection tensor $\phi$. An ordered set of hypernyms is identified for the child node x and, based on whether the pair is a positive pair, a determination is made as to whether the child node's hypernym is among the identified set of closest hypernyms. A loss function is employed to favor the identification of ordered sets in which the child node's actual hypernym or parent is among the set of hypernyms and, for negative pairs, favor the identification of ordered sets in which the supplied hypernym (of the pair) is not among the set. In processing the various pairs of the training set, the results are used to update the projection tensors in the projection tensor $\phi$ that transforms the pair's child node x into the taxonomic hyperspace. These updates occur upon the condition that the success of the training set has not reached a predetermined threshold. Additionally, when the neural taxonomy expander, in training, reaches that predetermined threshold, the pairs of the validation set are used to validate the training of the neural taxonomy expander or, alternatively, determine that additional training is needed. Indeed, if the success of processing the validation set fails to reach the predetermined threshold, the information of the validation set is used to update the projection tensors in the projection tensor $\phi$, and the process of training the neural taxonomy expander with the training and validation sets is repeated. Of course, once validated, an executable neural taxonomy expander is generated. As those skilled in the art will appreciate, this executable neural taxonomy expander is one in which the training mechanisms are removed, leading to efficient use and execution of the trained neural taxonomy expander.

In short, item 106 of FIG. 1 illustrates at least some of the processing for determining the correct positive of the candidate node 102 (Bitcoin) in the taxonomy 100. Indeed, according to aspects of the disclosed subject matter, the process for placing a candidate c in the taxonomy 100 includes the computation, by similarity function s, of the candidate c, e.g., $s(c_{bitcoin}, v_{digital\ currency})$, to measure taxonomic relatedness. As will be discussed in greater detail below and according to various aspects of the disclosed subject matter, taxonomic relatedness is defined via linear maps $P_1 \ldots P_k$ and taxonomy node embeddings w( ), e.g., $w(v_{digital\ currency})$, jointly trained to minimize large-margin ranking loss.

Figure 2:
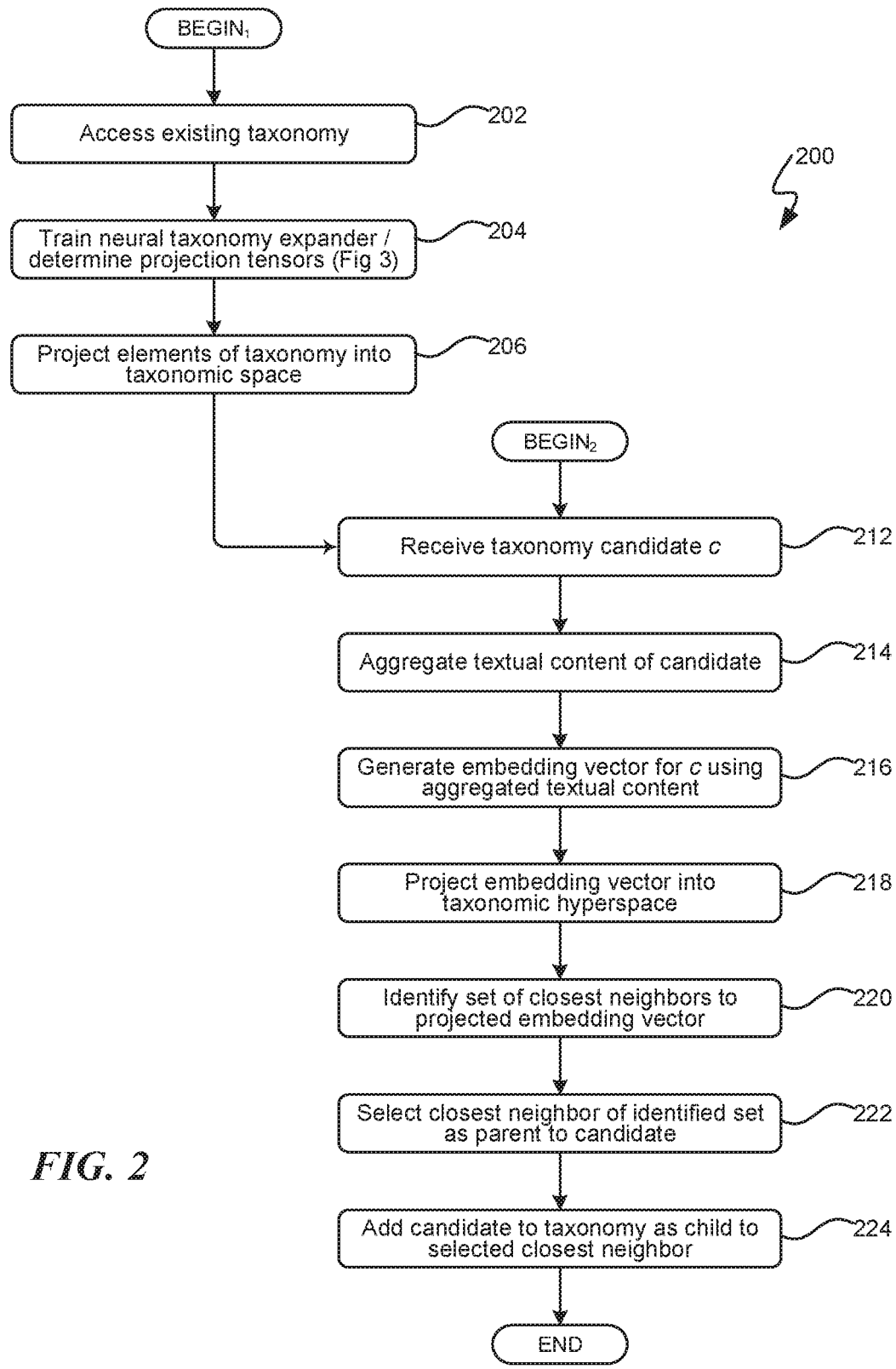
FIG. 2 is a flow diagram illustrating an exemplary routine suitable for positioning a taxonomy candidate c into a taxonomic hierarchy T in accordance with aspects of the disclosed subject matter.

Turning to FIG. 2, FIG. 2 is a flow diagram illustrating an exemplary routine 200 suitable for positioning or placing a taxonomy candidate c into a taxonomic hierarchy, in accordance with aspects of the disclosed subject matter. For discussion and illustration purposes, the method 200 includes two beginning points: one that includes training a neural taxonomy expander for placing taxonomy candidates into an existing taxonomy, and a second that utilizes a trained neural taxonomy expander for placing taxonomy candidates into an existing taxonomy.

As to the first beginning point, at block 202, an existing taxonomy is accessed. According to various aspects of the disclosed subject matter, this existing taxonomy is a curated taxonomy such that the relationships (child to parent) are considered the correct relationships. In an actual embodiment, a human-curated taxonomy comprising eleven thousand nodes, arranged in a directed, acyclical graph of parent and child nodes, is used. In addition to nodes and relationship information, information regarding the existing taxonomy T is also accessed, especially including textual content associated with each node within the taxonomy. With this information, at block 204 the neural taxonomy expander is trained to project a taxonomy candidate c into the taxonomy T. Discussion of this training is set forth in greater detail below in regard to FIG. 3.

Figure 3:
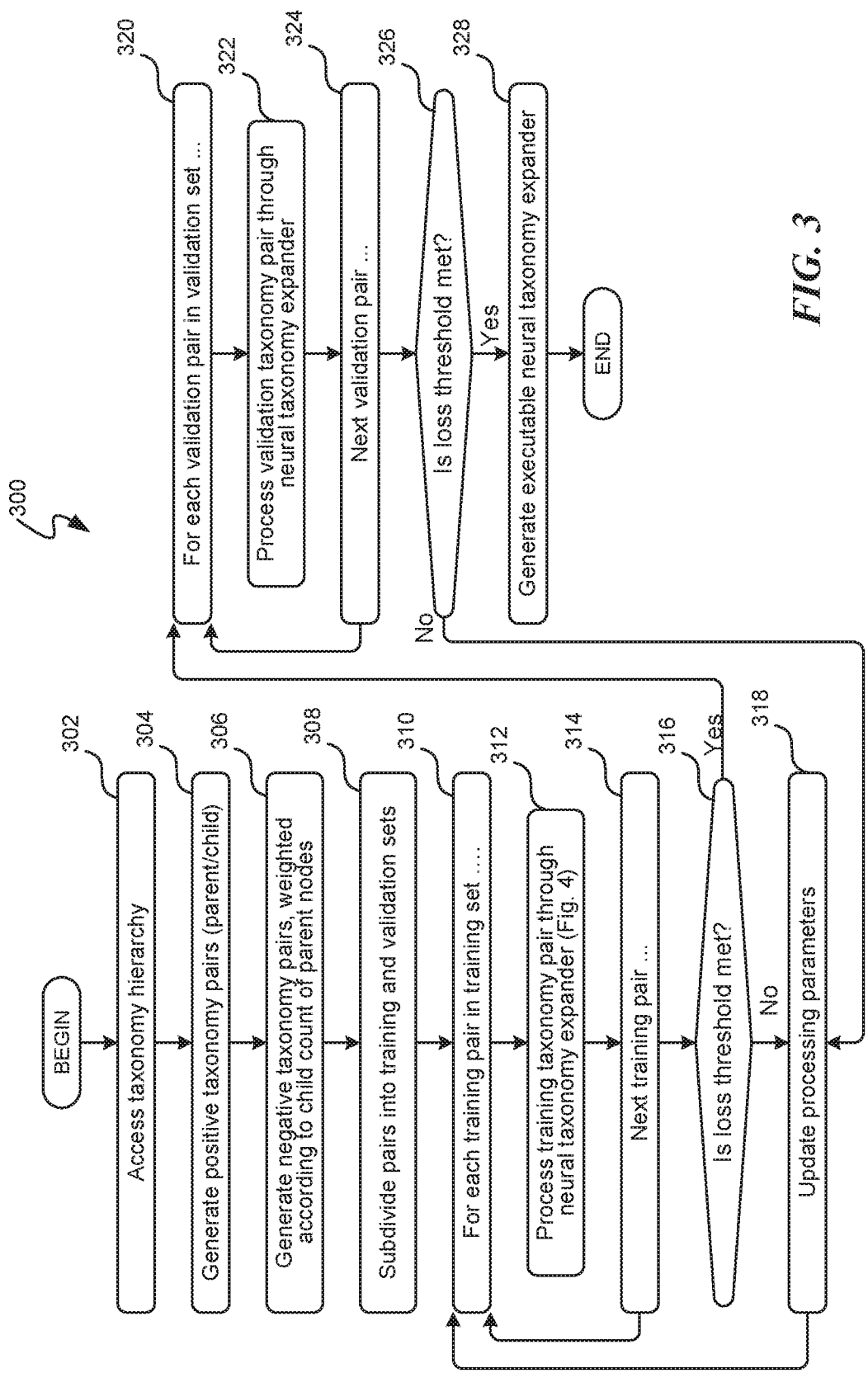
FIG. 3 is a flow diagram illustrating an exemplary routine suitable for training a neural network (i.e., a neural taxonomy expander) to determine projection tensors suitable for use by a projection function to project a taxonomy candidate c into an existing taxonomic hierarchy T, and identifying the candidate's likely parent within the taxonomy, in accordance with aspects of the disclosed subject matter.

Turning to this discussion, FIG. 3 is a flow diagram illustrating an exemplary routine 300 suitable for training a neural network to determine a projection tensor $\phi$ of a plurality of matrices for use in a projection function suitable, for projecting a taxonomy candidate c into an existing taxonomic hierarchy T and identifying the candidate's likely parent within the taxonomy, in accordance with aspects of the disclosed subject matter. To begin, at block 302, the taxonomy T is accessed. As indicated above, the taxonomy T includes textual information associated with each node in the taxonomy. Alternatively or additionally, each node within the taxonomic hierarchy T is already associated with an embedding vector $e_h$ based on the node's aggregated textual content. At block 304, taxonomy pairs {x, h}, are generated from the taxonomy T, with each taxonomy pair including a child node (x) and the child's immediate parent node (h). In various instances, these taxonomy pairs may be viewed as positive taxonomy pairs, indicating that these pairs reflect the actual familial relations of the curated taxonomy, i.e., that parent node h is the immediate parent of child node x.

In addition to generating positive taxonomy pairs, at block 306 negative taxonomy pairs are also generated. In contrast to the positive taxonomy pairs, negative taxonomy pairs {x, h'} include a child node x and a hypernym node h' that is not the child node's immediate parent. Additionally, the generation of the taxonomy pairs is weighted in a way that there are a number of negative taxonomy pairs generated for parent nodes equal or proportional to the number of actual children that a given parent node has. For example, in the taxonomy segment 100 of FIG. 1, there will be at least three negative taxonomy pairs generated for parent node 108 (Currency) since parent node 108 has three child nodes in the taxonomy. In contrast, for parent node 104 (Coinage) there will be two negative pairs generated. Of course, in various embodiments this balancing does not have to correspond to a 1:1 positive/negative pair generation. Indeed, there may be any number of multipliers for the number of pairs that are generated, e.g., 2:1 positive/negative pair generation. Further, the weighting is not required to be linear, such that for parent nodes that have more children, the increased number of negative nodes including a given parent does not need to proportionally match the negative nodes including parents with fewer child nodes.

At block 308, the taxonomy pairs, including both positive and negative taxonomy pairs, are randomly subdivided into training and validation sets. According to aspects of the disclosed subject matter, random selection ensures balanced training and proper validation of the current training of the neural network.

At block 310 an iteration loop/construct is begun to iterate through the taxonomy pairs (including both positive and negative taxonomy pairs) of the training set. At block 312, a current training taxonomy pair is processed by the neural network. Processing includes projecting an embedding vector ex associated with the child node x into a multi-dimensional, taxonomic hyperspace according to a projection tensor $\phi$ comprising a plurality of projection matrices.

Regarding the projection tensor $\phi$ of matrices, according to aspects of the disclosed subject matter, each matrix is a k×D×D matrix, where k represents a desired number of projections into the multi-dimensional space by the projection function of a child node x, and D represents the number of dimensions of each embedding vector. Each projection tensor provides a type or form of weighting value used to transform or "project" the value of a corresponding dimension of the embedding vector $e_x$ into the multi-dimensional space. This projection process is described below in regard to the neural taxonomy expander discussed in regard to FIG. 4.

Figure 4:
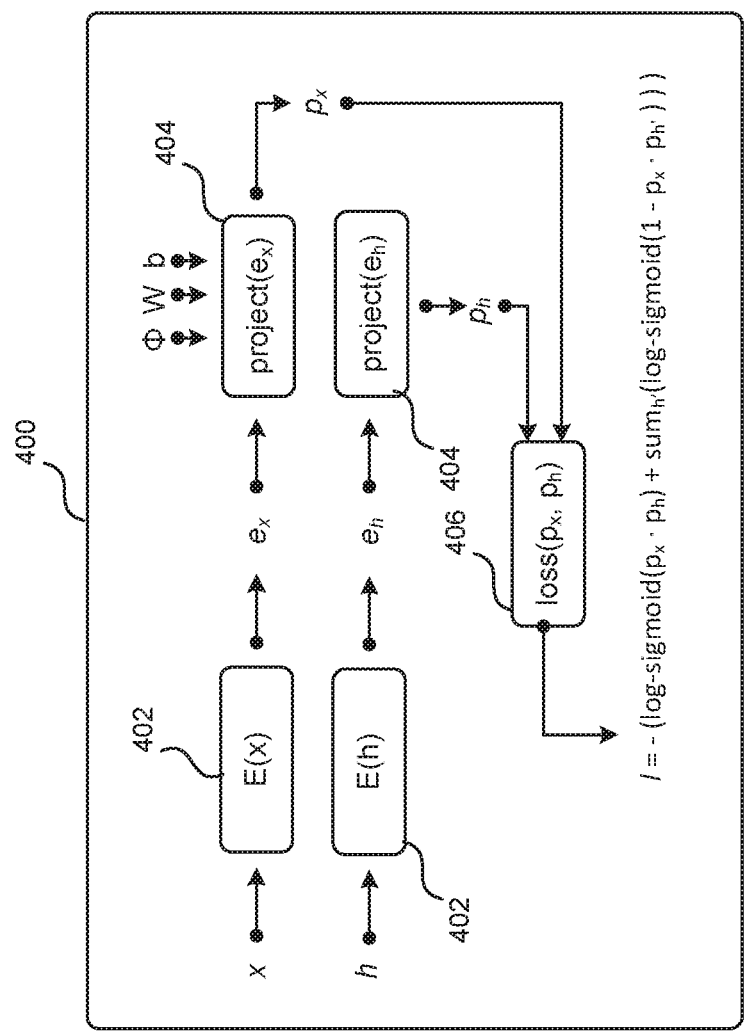
FIG. 4 is a block diagram of exemplary components of a neural taxonomy expander formed in accordance with aspects of the disclosed subject matter.

Indeed, turning to FIG. 4, this figure is a block diagram of exemplary components of a neural taxonomy expander 400 formed in accordance with aspects of the disclosed subject matter. As shown in FIG. 4, the child node x is passed to an embedding vector generator. More particularly, textual content associated with the child node x, such as content name, user comments, content title, and the like, are passed to and processed by the embedding vector generator E( ) 402 to produce an embedding vector $e_x$.

The candidate's embedding vector $e_x$ is then projected into a taxonomic hyperspace using a projection function, project( ) 404, to produce $p_x$. This projection function takes, as additional input, $\phi$ (the projection tensor) corresponding to a plurality of k×D×D matrices, with k corresponding to a predetermined number of projections, and D corresponding to the dimensionality of the embedding vectors (e.g., $e_x$). Additionally, W corresponds to a 1×k affine matrix, and b corresponds to a 1×D affine matrix. The projections are then processed by a loss function/406, according to the formula:

$$l=-(\log\text{-sigmoid}(p_x \cdot p_h)+\text{sum}_h(\log\text{-sigmoid}(1-p_x \cdot e_{h'}))).$$

The output of this formula is used to determine whether a predetermined accuracy or loss threshold has been met in the training.

Regarding the loss function/406, according to aspects of the disclosed subject matter and as suggested in the formula illustrated above, this loss function is computed as the sum of two components. The first component (log-sigmoid $(p_x \cdot p_h)$) encourages the child node's projection $p_x$ to be similar to its actual parent embedding vector $e_h$. The second component $(\text{sum}_{h'}(\log\text{-sigmoid}(1-p_x \cdot p_{h'})))$ encourages the child node's projection to be dissimilar from negatively sampled parent embedding vectors, $e_{h'}$. Additionally, the projection tensors of $\phi$ are initialized as zero-mean Gaussian tensors, ensuring that initially, every projected child node x is slightly noise tolerant of its original embedding.

In regard to measuring the accuracy (i.e., the predetermined loss threshold) for the loss function/406, for each child node x, the neural taxonomy expander is configured to select the 15 most likely parents (or hypernyms). According to aspects of the disclosed subject matter, this set of likely parents may be ranked in order of their closeness to the projected child node $p_x$. In various embodiments, this likelihood is determined according to a cosine similarity of the projected child node $p_x$ in view of the hypernym embedding vectors in the taxonomic hyperspace, based on all of the dimensions of the embedding vectors.

To determine metrics of the projections, and according to aspects of the disclosed subject matter, a Mean Reciprocal Rank (MRR) is generated for each pair. More particularly, a reciprocal rank is determined for each child/hypernym pair according to the position of the actual parent of the child node in the set of likely hypernyms. For example, assume that the projected output for child node x is the set $\{h_1, h_2, h_3, h_4, \text{and } h_5\}$. In this set, while denoted as $h_1$, $h_2$, $h_3$, etc., the actual parent for the child node x may be none or all of the hypernyms, meaning that $h_1$ may be equal to $h_2$, etc. The reciprocal rank is determined according to position of the first actual parent. In this example, assume that the actual parent for child node x is both $h_2$ and $h_3$. Thus, for this child node x, the reciprocal rank is 0.5. In the event that the actual parent for the child node x is not within the set, the reciprocal rank is zero (0). The averaged reciprocal ranks for each of the child/hypernym pairs is determined to generate an MRR. As suggested above, the MRR rewards the instance in which non-parents for a child node x are predicted with low probability.

In addition to generating the MRR for the set of pairs, a Mean Average Precision (MAP) is also generated. An average precision (AP) is generated for each pair. This average precision is dependent on whether each instance of the actual parent is identified. In the example above, if the actual parent for the child node x is $h_2$ and $h_3$, and both are identified in the resulting set, the average precision is 2/2 or 1.0. The map is the mean for the AP's over all child nodes. According to aspects of the disclosed subject matter, both the MRR and the MAP are used in determining the performance metrics of the neural taxonomy expander to identify whether a loss threshold is met during training.

Returning back to FIG. 3, after having processed the current training pair, at block 314 the iteration process returns to block 310 to process the next training pair, if there are more training pairs to process. In the alternative, if there are no more training pairs to process, the routine 300 proceeds to decision block 316.

At decision block 316, a determination is made as to whether the accuracy/of the most recent processing with the training set has achieved a threshold level of accuracy. If the threshold level of accuracy is not met, the routine 300 proceeds to block 318 where the processing parameters, particularly the projection tensors, are updated in view of the accuracy results of the previous training period. Thereafter, the routine 300 returns to block 310 to again process the training pairs. This repetitive training process continues until, at decision block 316, the accuracy threshold is met.

Once the accuracy threshold is met, the routine 300 proceeds to block 320. In similar manner to the processing of training pairs, at block 320 an iteration loop is begun to iterate through the validation pairs. Thus, at block 322, a current validation pair is processed, and the accuracy of the projection is recorded. At block 324, if there are additional validation pairs to process, the routine 300 returns to block 320. Alternatively, if there are no additional validation pairs to process, the routine proceeds to decision block 326.

At decision block 326, a determination is made as to whether the predetermined loss threshold/accuracy threshold is met. If not, the routine 300 returns to block 318 where the processing parameters are updated. Thereafter, the routine 300 proceeds to block 310 to continue the training of the neural network with the training pairs. In the alternative, at decision block 326, if the threshold loss level/accuracy level is met, the routine proceeds to block 328 where an executable version of the now-trained neural taxonomy expander is generated for use in expanding the accessed taxonomy. Thereafter, routine 300 terminates.

Returning again to routine 200, once the neural taxonomy expander is generated, a new begin location is used, beginning at block 212. At block 212, a taxonomy candidate c is received, where c is to be placed in the existing taxonomy. At block 214, the textual content relating to taxonomy candidate c is aggregated. According to aspects of the disclosed subject matter, this textual content may include any one or more of a title associated with the content item, captions associated with the content item, collection titles and/or captions in which the content item is a member, a URL (uniform resource locator) or URI (uniform resource identifier) associated with the content item, user comments made in regard to the content item, the subject matter of the content item, and the like.

After aggregating textual content relating to the taxonomy candidate, at block 216 an embedding vector, $e_c$, is generated for the candidate. In various embodiments, the embedding vector, $e_c$, is generated by a third-party embedding vector generator, such as FastText or ConceptNet. At block 218, the taxonomy candidate's embedding vector $e_c$ is then projected into the taxonomic hyperspace (i.e., the multidimensional space) using the projection tensors learned/trained during the training of the neural taxonomy expander.

At block 220, a set of closest neighbors in the taxonomic hyperspace is identified, where this set of closest neighbors represents the most likely parents of the taxonomy candidate c. According to aspects of the disclosed subject matter, this set of closest neighbors is an ordered list, ordered according to their closeness to the projected taxonomy candidate in the taxonomic hyperspace and representing the likelihood of the node being the parent. At block 222, the closest neighbor from the set is selected as the parent of the taxonomy candidate c. In various embodiments, the determination of closest neighbor (or closest neighbors) to the projected taxonomy candidate $p_c$ may be made according to a cosine similarity evaluation of the projected vectors of both the taxonomy candidate and existing taxonomy nodes into the taxonomic hyperspace. At block 224, the taxonomy candidate c is added to the taxonomy with the selected parent as its parent.

Optionally, the candidate and the set of closest neighbors may be evaluated to determine the accuracy of the neural taxonomy expander. Metrics such as mean reciprocal rate (MRR) and mean average precision (MAP) may be determined to see whether the neural taxonomy expander is performing at an acceptable threshold level, which may lead to new training of the neural taxonomy expander as discussed in regard to FIG. 3.

Thereafter, routine 200 terminates.

In regard to the identification of likely neighbors to a taxonomy candidate c in an existing taxonomy, and in regard to training the neural taxonomy expander, in a general sense the effort is to determine a similarity function s that determines the similarity of the taxonomy candidate c to existing interest nodes in the existing interest taxonomy. Generally speaking, this similarity function can be described in formula as:

$$s(c,v)=(e_c M) \cdot e_v$$

where c represents the taxonomy candidate to be added to the taxonomy, v represents an existing interest node in the interest taxonomy (in consideration as a potential parent node for taxonomy candidate c), $e_c$ is the embedding vector for the taxonomy candidate c, $e_v$ is the embedding vector for the interest node v, and M is a linear transformation of the taxonomic relationships of the interest taxonomy in the embedding space of the interest nodes (and taxonomy candidate c) of the interest taxonomy.

This generalized formula works fine until the interest taxonomy includes child nodes that have relationships to multiple parents. For example, if an interest node in the interest taxonomy was "Thanksgiving", it is entirely conceivable that this interest node would have multiple parent nodes including "US Holidays" and "Meals." To address this, rather than having a single linear transformation M, a linear transformation of the taxonomic relationships for each interest/parent node v is generated. The resulting modification to the similarity function s is as follows:

$$s(c,v)=(e_c M_v) \cdot e_v$$

where $M_v$ is the linear transformation specific to interest node v.

One of the issues in this updated formula is the number of linear transformations $M_v$ that are generated, greatly impacting the amount of training that must occur to fully train the neural taxonomy expander 400. To mitigate this problem, we can exploit the fact that the number of distinct edge semantics (child to parent relationships) is much smaller than the possible number, i.e., any given child/interest node in the interest taxonomy will not have a relationship to ALL other interest nodes in the taxonomy, but rather a small number of parent/interest nodes. In this, we assume that there are k edge semantics (relationships) for a given interest node and define each linear map My as a weighted combination of k linear maps, $P_1$–$P_k$, that are shared across all taxonomy nodes:

$$M_v = \sum_{i=1}^{k} sparsemax(w_v)[i] x P_i$$

where $w_v$ represents an embedding vector of interest node v to be learned, and the sparsemax( ) function transforms the embedding into a sparse probability distribution. This transformation into the sparse probability distribution encourages the neural taxonomy expander to allocate weight to a few of the k potential edge semantics and reduces the number of parameters that must be considered without fragmenting the training data.

Taxonomic similarity or relatedness defined as such implies a modeling decision: all the incoming edges from the children of any interest node v share the same semantics, as represented by $M_v$, and driven by its embedding vector $w_v$. In short, the embedding of a given interest node v captures its taxonomic role in the overall interest taxonomy. Advantageously, this allows interest nodes to be linguistically dissimilar but share similar taxonomic roles.

According to aspects of the disclosed subject matter, in order to rank the interest nodes for a given taxonomy candidate c, such that the true parent/interest node in the interest taxonomy of the taxonomy candidate c is ranked higher than other interest nodes, the neural taxonomy expander 400 is trained to identify child-parent relatedness or similarity by a wide margin over other candidate parent nodes. Formally, this goal is to satisfy the following constraint for every child-parent pair (c, v):

$$s(c,v) \geq s(c,v') + \gamma(c,v,v')$$

where v' represents an interest node of the interest taxonomy that is not the true parent/interest node (v) of taxonomy candidate c, and the function $\gamma(c, v, v')$ represents a desired margin of difference in the predicted similarities of (c, v) and (c, v'). To this end, an error function $\varepsilon(c, v, v')$ is defined to satisfy the large margin constraint, denoting the degree to which a non-parent/interest node v' violates the large-margin constraint of child-parent pair (c, v):

$$\varepsilon(c,v,v') = \max[0, s(c,v') - s(c,v) + \gamma(c,v,v')].$$

In this, when the large-margin constraint is satisfied, $\varepsilon(c, v, v')=0$. In the alternative, when the large-margin constraint is not satisfied, $\varepsilon(c, v, v')>0$.

According to aspects of the disclosed subject matter, with the error function $\varepsilon(c, v, v')$ defined, we derive a loss function L(T) as the total violation of the large-margin constraints by the non-parent/interest nodes corresponding to every child-parent pair (c, v):

$$L(T) = \sum_{(c,v) \in E} \sum_{v' \in V - H(c)} \varepsilon(c, v, v')$$

where E represents a set of all child-parent nodes in the interest taxonomy, V represents a set of all parent nodes of the interest taxonomy, and H(c) represents the actual set of parents for taxonomy candidate c. This leads to the proposition that when $\gamma(c, v, v')$ is equal to d(v, v'), where d(*, *) represents the shortest path between two interest nodes in the taxonomy, the loss function L(T) is an upper-bound on the sum of the undirected shortest-path distances between the highest-ranked predicted parent/interest nodes and the true parent/interest node according to the formula:

$$\sum_{(c,v) \in E} d(v, v\hat{}(c)) \leq L(T)$$

where v^(c) represents the highest-ranked predicted parent for taxonomy candidate c.

Figure 5:
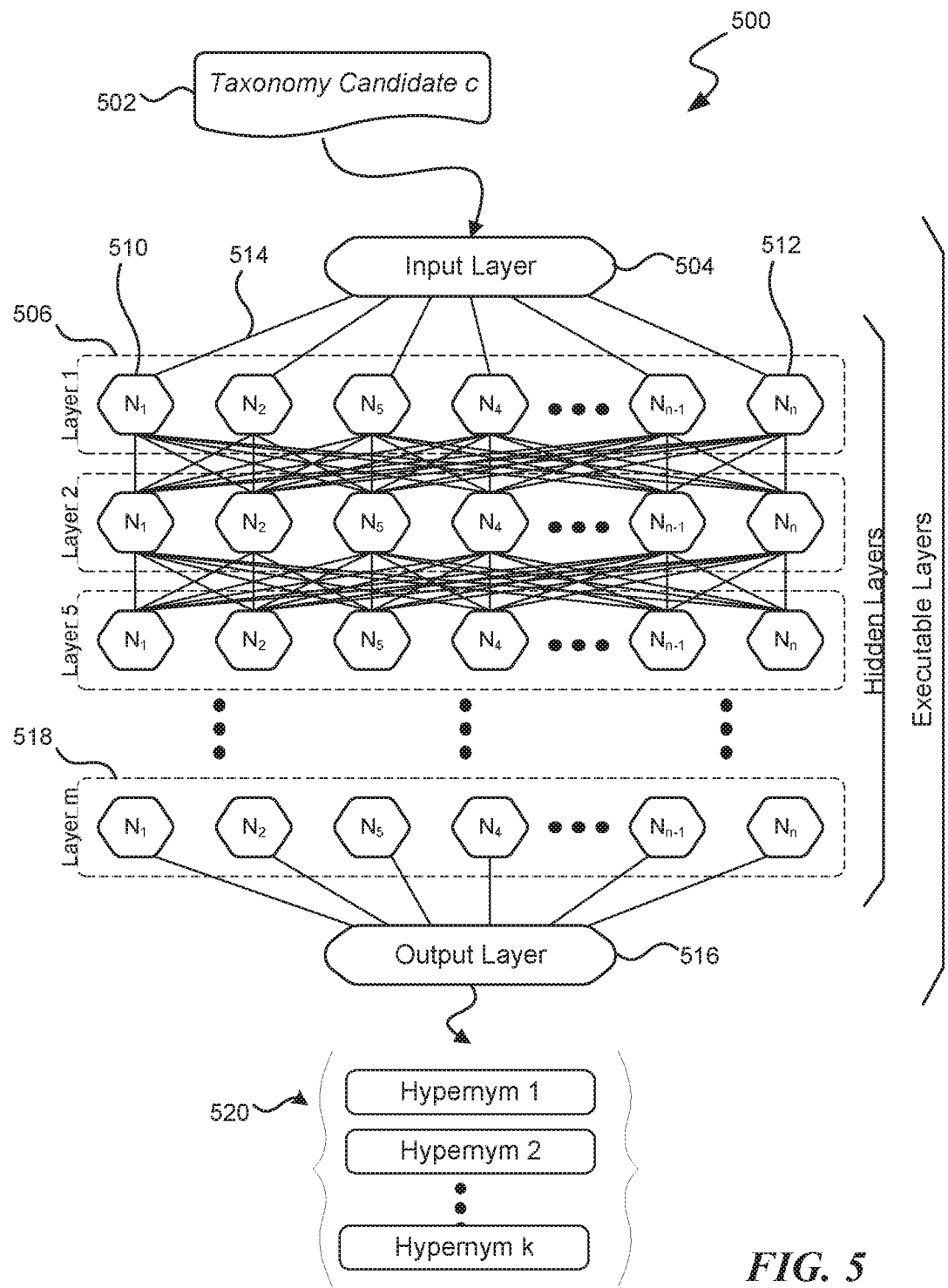
FIG. 5 is a pictorial diagram illustrating elements of a neural network/machine learning model suitable for identifying the query's likely parent within the taxonomy in accordance with aspects of the disclosed subject matter.

Regarding the training of the neural taxonomy expander 400 discussed above, reference is now made to FIG. 5. Indeed, FIG. 5 is a pictorial diagram illustrating elements of a neural network 500 (sometimes also referred to as a machine learning model) suitable for training as a neural taxonomy expander in identifying a parent node (also called a hypernym) in an existing taxonomy for a given taxonomy candidate c, in accordance with aspects of the disclosed subject matter.

As those skilled in the art will appreciate, a neural network 500 comprises multiple executable layers, including an input layer 504, an output layer 516, and one or more hidden layers. By way of illustration, the neural network 500 includes m hidden layers, including hidden layers 506 and 518. The input layer 504 accepts the input data (e.g., input from taxonomy candidate 502) for which the neural network 500 will identify one or more likely hypernyms.

The input layer 504 accepts the input data, in this illustrated instance taxonomy candidate 502, any metadata that may be associated with the input item and/or textual content and, according to one or more predetermined algorithms and/or heuristics, generates a plurality of values for one or more aspects, features and/or facets from the input. These values, not shown in FIG. 5 but implied by the various edges, such as edge 514, extending from the input layer 504 to the various processing nodes of the first hidden layer 506, constitute at least some of the output of the input layer and are distributed as input data or input values to processing nodes of the first hidden layer of the neural network 500, such as processing nodes 510 and 512.

Typically, though not exclusively, a value or facet of the input data passed from the input layer 504 to a first processing node in the first hidden layer, such as node 510 of hidden layer 506, is different than a value/facet passed to a second processing node of that same hidden layer, such as to node 512 of hidden layer 506.

Each hidden layer, including hidden layers 506 and 518, comprises a plurality of processing or projection nodes. By way of illustration and not limitation, hidden layer 506 includes n processing nodes, $N_1$-$N_n$. While the processing nodes of the first hidden layer 506 typically, though not exclusively, have a single input value from the input layer 504, processing nodes of subsequent hidden layers typically have input values from one or more processing nodes of the previous input layer. Of course, in various embodiments the processing nodes of the first hidden layer 506 may receive, as input values, all output values of the input layer 504.

In various embodiments and as illustrated in the executable neural network 500, each hidden layer (except for the first hidden layer 506) accepts input data/signals from each processing node of the prior hidden layer, as indicated by the edges proceeding from a processing node of an "upper" hidden layer (e.g., layer 506) to a "lower" hidden layer. Of course, alternative embodiments need not include such wide distribution of output values to the processing nodes of a subsequent, lower level.

Each processing node implements one or more "convolutions," "computations" or "projections" on the input data it receives (whether the processing node receives a single item of input data, or plural items of input data) to produce a single output value. These convolutions, projections, and/or computations may include any number of functions or operations to generate the output data such as, by way of illustration and not limitation, data aggregations, clustering various input values, transformations of input values, combination of plural input values, selections and/or filters among input values, mathematical manipulations of one or more input values, linear and/or multivariate regressions of the input values, statistical determinations of the input values, predictive evaluations, and the like. Moreover, individual items of input data may be weighted in any given processing node such that the weighted input data plays a greater or lesser role in the overall computation for that processing node. Items of input data may be weighted in such a manner as to be ignored in the various convolution and computations. Hyperparameters (data/values that are input from sources external to processing nodes of a prior input level) may also be utilized by all or some of the processing nodes of a hidden layer.

As will be appreciated by those skilled in the art, one of the interesting aspects of machine learning/neural networks is that the various executable levels are adaptable to accommodate self-learning. In other words, when provided feedback, modifications may be made to the weights, parameters, and processing operations of the processing nodes in the various layers, in order to achieve better results. These modifications include modifications to the matrices of projection tensor o used to map items into the taxonomic hyperspace. Due to this adaptability, except for initially established computations of the various processing nodes in a training phase of the machine learning process, a person is unlikely to have specific insight or knowledge as to the exact nature of output values and, correspondingly, the exact nature of convolutions and/or computations that any particular processing node of a hidden layer may utilize. Instead, during the training process of a machine learning process, the machine learning process makes its own determinations as to how to modify each computation of a given processing node to produce better/superior results for the input values it receives.

At the final hidden layer, e.g., layer 518, the processing nodes provide their output data to the output layer 516. The output layer 516 performs whatever final aggregations, calculations, transformations, projections, normalizations and/or interpretations of the various items of input data to produce a set 520 of one or more output values corresponding to the most likely hypernyms for the taxonomy candidate 502.

Regarding routines 200 and 300 described above, as well as other routines and/or processes described or suggested herein, while these routines/processes are expressed in regard to discrete steps, these steps should be viewed as being logical in nature and may or may not correspond to any specific actual and/or discrete execution steps of a given implementation. Also, the order in which these steps are presented in the various routines and processes, unless otherwise indicated, should not be construed as the only or best order in which the steps may be carried out. Moreover, in some instances, some of these steps may be combined and/or omitted. Optimizations of routines may be carried out. Those skilled in the art will recognize that the logical presentation of steps is sufficiently instructive to carry out aspects of the claimed subject matter irrespective of any specific or particular development or coding language in which the logical instructions/steps are encoded. Additionally, while some of these routines are expressed in the context of recursive routines, those skilled in the art will appreciate that such recursive routines may be readily implemented as non-recursive calls without actual modification of the function or result. Accordingly, the particular use of programming and/or implementation techniques and tools to implement a specific or particular functionality should not be construed as limiting upon the disclosed subject matter.

Of course, while these routines and/or processes include various novel features of the disclosed subject matter, other steps (not listed) may also be included and carried out in the execution of the subject matter set forth in these routines, some of which have been suggested above. Those skilled in the art will appreciate that the logical steps of these routines may be combined or be comprised of multiple steps. Steps of the above-described routines may be carried out in parallel or in series. Often, but not exclusively, the functionality of the various routines is embodied in software (e.g., applications, system services, libraries, and the like) that is executed on one or more processors of computing devices, such as the computing device described in FIG. 7 below. Additionally, in various embodiments all or some of the various routines may also be embodied in executable hardware modules including, but not limited to, systems on chips (SoC's), codecs, specially designed processors and or logic circuits, and the like.

As suggested above, these routines and/or processes are typically embodied within executable code blocks and/or modules comprising routines, functions, looping structures, selectors and switches such as if-then and if-then-else statements, assignments, arithmetic computations, and the like that, in execution, configure a computing device to operate in accordance with the routines/processes. However, the exact implementation in executable statement of each of the routines is based on various implementation configurations and decisions, including programming languages, compilers, target processors, operating environments, and the linking or binding operation. Those skilled in the art will readily appreciate that the logical steps identified in these routines may be implemented in any number of ways and, thus, the logical descriptions set forth above are sufficiently enabling to achieve similar results.

While many novel aspects of the disclosed subject matter are expressed in executable instructions embodied within applications (also referred to as computer programs), apps (small, generally single or narrow purposed applications), and/or methods, these aspects may also be embodied as computer executable instructions stored by computer readable media, also referred to as computer readable storage media, which are articles of manufacture. As those skilled in the art will recognize, computer readable media can host, store and/or reproduce computer executable instructions and data for later retrieval and/or execution. When the computer executable instructions that are hosted or stored on the computer readable storage devices are executed by a processor of a computing device, the execution thereof causes, configures and/or adapts the executing computing device to carry out various steps, methods and/or functionality, including those steps, methods, and routines described above in regard to the various illustrated routines and/or processes. Examples of computer readable media include but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random-access memory (RAM), read-only memory (ROM), memory cards, thumb drives, and the like; cloud storage (i.e., an online storage service); and the like. While computer readable media may reproduce and/or cause to deliver the computer executable instructions and data to a computing device for execution by one or more processors via various transmission means and mediums, including carrier waves and/or propagated signals, for purposes of this disclosure computer readable media expressly excludes carrier waves and/or propagated signals.

Figure 6:
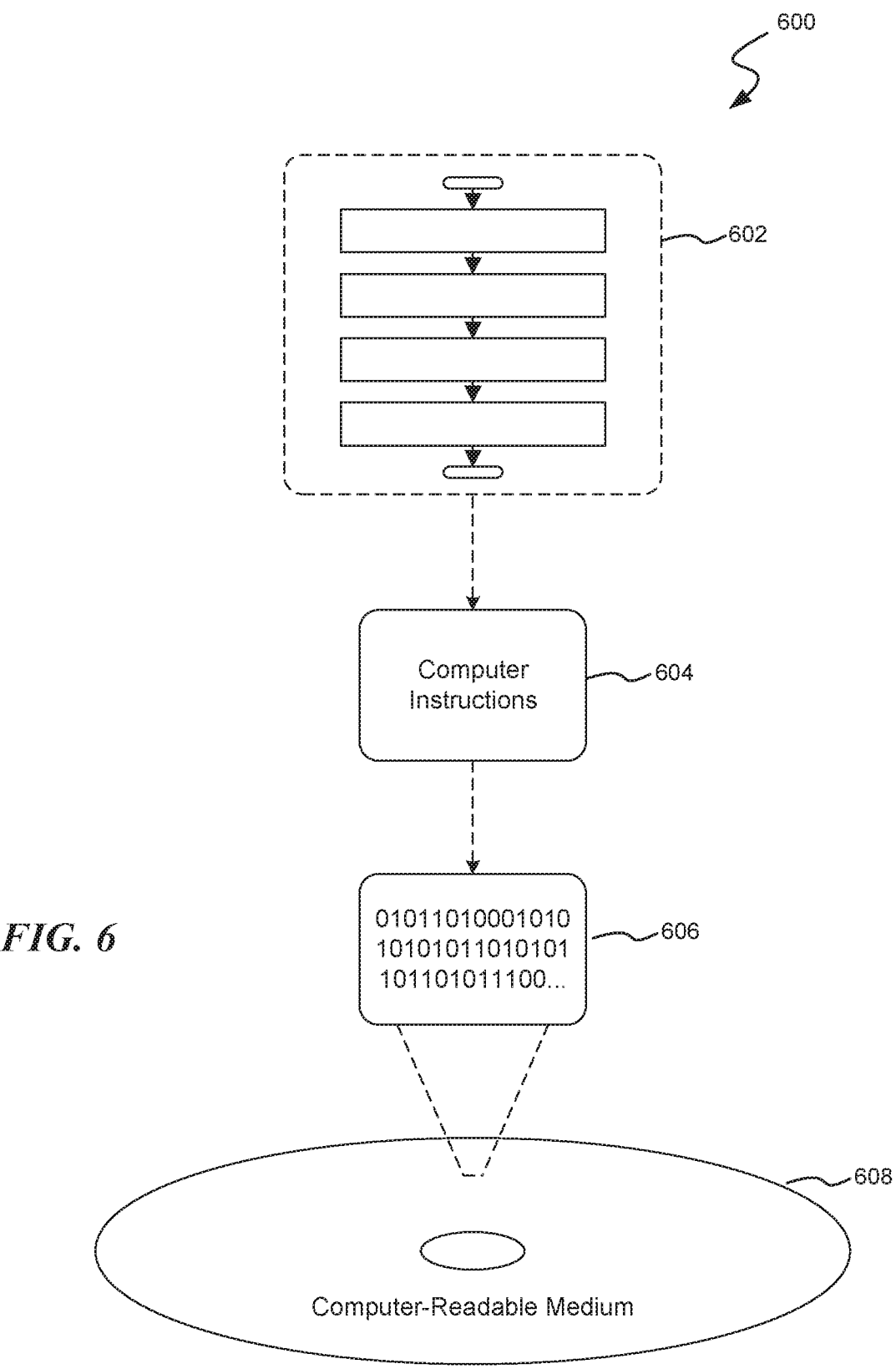
FIG. 6 is a block diagram illustrating an exemplary computer readable medium encoded with instructions for implementing aspects of the disclosed subject matter.

Regarding computer readable media, FIG. 6 is a block diagram illustrating an exemplary computer readable medium encoded with instructions for implementing aspects of the disclosed subject matter. More particularly, the implementation 600 comprises a computer-readable medium 608 (e.g., a CD-R, DVD-R or a platter of a hard disk drive), on which is encoded computer-readable data 606. This computer-readable data 606 in turn comprises a set of computer instructions 604 configured to operate according to one or more of the principles set forth herein. In one such embodiment 602, the processor-executable instructions 604 may be configured to perform a method, such as at least some of exemplary routine 200 and 300, for example. In another such embodiment, the processor-executable instructions 604 may be configured to implement a system on a computing device, such as at least some of the exemplary, executable components of computing device 700 of FIG. 7, as described below. Many such computer readable media may be devised, by those of ordinary skill in the art, which are configured to operate in accordance with the techniques presented herein.

Figure 7:
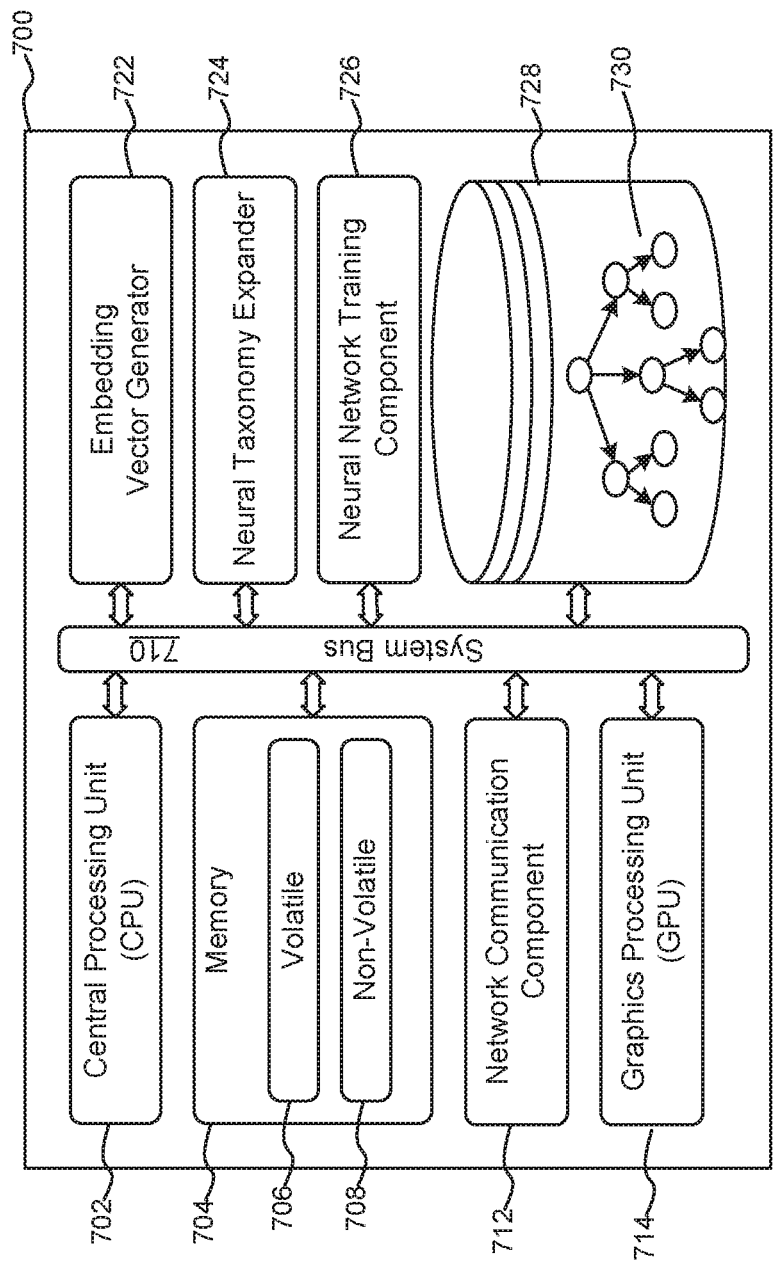
FIG. 7 is a block diagram illustrating an exemplary computing system (or computing device) suitably configured for implementing taxonomy expansion service in accordance with aspects of the disclosed subject matter.

Turning to FIG. 7, FIG. 7 is a block diagram illustrating an exemplary computing system 700 (also referred to as a computing device) suitably configured for implementing a neural taxonomy expander in accordance with aspects of the disclosed subject matter. The computing system 700 typically includes one or more central processing units (or CPUs), such as CPU 702, and further includes at least one memory 704. The CPU 702 and memory 704, as well as other components of the computing system, are interconnected by way of a system bus 710.

As will be appreciated by those skilled in the art, the memory 704 typically (but not always) comprises both volatile memory 706 and non-volatile memory 708. Volatile memory 706 retains or stores information so long as the memory is supplied with power. In contrast, non-volatile memory 708 is capable of storing (or persisting) information even when a power supply is not available. In general, RAM and CPU cache memory are examples of volatile memory 706 whereas ROM, solid-state memory devices, memory storage devices, and/or memory cards are examples of non-volatile memory 708.

As will be further appreciated by those skilled in the art, the CPU 702 executes instructions retrieved from the memory 704, from computer readable media, such as computer readable media 608 of FIG. 6, and/or other executable components in carrying out the various functions of the disclosed subject matter. The CPU 702 may be comprised of any of a number of available processors such as single-processor, multi-processor, single-core units, and multi-core units, which are well known in the art.

Further still, the illustrated computing system 700 typically also includes a network communication interface 712 for interconnecting this computing system with other devices, computers and/or services over a computer network. The network communication interface 712, sometimes referred to as a network interface card or NIC, communicates over a network using one or more communication protocols via a physical/tangible (e.g., wired, optical fiber, etc.) connection, a wireless connection such as WiFi or Bluetooth communication protocols, NFC, or a combination thereof. As will be readily appreciated by those skilled in the art, a network communication interface, such as network communication component 712, is typically comprised of hardware and/or firmware components (and may also include or comprise executable software components) that transmit and receive digital and/or analog signals over a transmission medium (i.e., the network).

The illustrated computing system 700 also includes a graphics processing unit (GPU) 714. As those skilled in the art will appreciate, a GPU is a specialized processing circuit designed to rapidly manipulate and alter memory. Initially designed to accelerate the creation of images in a frame buffer for output to a display, due to their ability to manipulate and process large quantities of memory, GPUs are advantageously applied to training machine learning models and/or neural networks that manipulate large amounts of data. Indeed, one or more GPUs, such as GPU 714, are often viewed as essential processing components when conducting machine learning techniques. Also, and according to various embodiments, while GPUs are often included in computing systems and available for processing convolutions of machine learning models, such as GPU 714 of computing system 700, multiple GPUs are also often deployed as online GPU services or farms and machine learning processing are advantageously directed to conducting the various layers/convolutions of training a neural network.

The illustrated computing system 700 additionally includes an embedding vector generator 722. As those skilled in the art will appreciate, an embedding vector is an array or vector of values, each value corresponding to some particular aspect of the source item. According to aspects of the disclosed subject matter, an embedding vector for a taxonomy candidate is generated from aggregated textual content relating to the candidate. Often this type of embedding vector is referred to as a word embedding vector. In various embodiments of the disclosed subject matter, the embedding vector generator 722 may be configured to generate its own embedding vectors for input items or, in the alternative, obtain an embedding vector already configured for that purpose. At least one common embedding vector generator is the concept.net embedding vector.

Further still, the illustrated computing system 700 includes a neural taxonomy expander 724. As discussed above in regard to routine 200, the neural taxonomy expander 724, once trained, is configured to receive a taxonomy candidate and identify an ordered set of one or more hypernyms and use the most likely hypernym as the parent for the taxonomy candidate. The taxonomy candidate is then added to the taxonomy 730, as may be stored in a data store 728 by the computing system 700.

Regarding the neural taxonomy expander 724, the computing system 700 also includes a neural network training component 726 suitably configured to train the neural taxonomy expander. As suggested above in regard to routine 300 of FIG. 3, the neural network training component 726 accesses an existing taxonomy 728, generates taxonomy pairs and uses these pairs to train the neural taxonomy expander 724 to identify the most likely parent for a given taxonomy candidate c.

Regarding the various components of the exemplary computing device 700, those skilled in the art will appreciate that many of these components may be implemented as executable software modules stored in the memory of the computing device, as hardware modules and/or components (including SoCs—system on a chip), or a combination of the two. Indeed, components may be implemented according to various executable embodiments including, but not limited to, executable software modules that carry out one or more logical elements of the processes described in this document, or as hardware and/or firmware components that include executable logic to carry out the one or more logical elements of the processes described in this document. Examples of these executable hardware components include, by way of illustration and not limitation, ROM (read-only memory) devices, programmable logic array (PLA) devices, PROM (programmable read-only memory) devices, EPROM (erasable PROM) devices, and the like, each of which may be encoded with instructions and/or logic which, in execution, carry out the functions described herein.

While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A computer-implemented method for automatically locating a taxonomy candidate into an existing taxonomic hierarchy, the computer-implemented method comprising:
   training a neural taxonomy expander according to the existing taxonomic hierarchy, wherein training the neural taxonomy expander includes:
      generating a plurality of candidate/hypernym pairs, the plurality of candidate/hypernym pairs including positive candidate/hypernym pairs and negative candidate/hypernym pairs;
      subdividing the plurality of candidate/hypernym pairs into a training set and a validation set;
      repeatedly, until a predetermined loss threshold from processing the validation set is met:
         training the neural taxonomy expander according to the training set until the predetermined loss threshold is met in processing the training set;
         validating the neural taxonomy expander according to the validation set; and
         updating the neural taxonomy expander according to results of the training upon a determination that the predetermined loss threshold for the validation set is not met; and
      generating an executable neural taxonomy expander according to the trained neural taxonomy expander;
   generating an embedding vector of the taxonomy candidate;
   projecting the embedding vector of the taxonomy candidate into a taxonomic hyperspace according to a taxonomy projection by the executable neural taxonomy expander;
   identifying a set of closest neighbors of the existing taxonomic hierarchy to the projected embedding vector of the taxonomy candidate;
   determining a closest neighbor of the identified set of closest neighbors as an immediate parent of the taxonomy candidate; and
   adding the taxonomy candidate into the existing taxonomic hierarchy as a child node of the determined immediate parent.

2. The computer-implemented method of claim 1, wherein generating the embedding vector of the taxonomy candidate comprises:
   aggregating textual content relating to the taxonomy candidate; and
   generating the embedding vector of the taxonomy candidate according to the aggregated textual content relating to the taxonomy candidate.

3. The computer-implemented method of claim 2, wherein the aggregated textual content relating to the taxonomy candidate comprises any one or more of:
   a title associated with the taxonomy candidate;
   one or more captions associated with the taxonomy candidate;
   collection titles of collections in which the taxonomy candidate is a member;
   a URL (uniform resource locator) or URI (uniform resource identifier) associated with the taxonomy candidate;
   one or more user comments made in regard to the taxonomy candidate; and
   textual content descriptive of a subject matter of the taxonomy candidate.

4. The computer-implemented method of claim 2, further comprising projecting each of a plurality of nodes of the existing taxonomic hierarchy into the taxonomic hyperspace according to the taxonomy projection of the executable neural taxonomy expander.

5. The computer-implemented method of claim 4, wherein projecting each of the plurality of nodes of the existing taxonomic hierarchy into the taxonomic hyperspace according to the taxonomy projection of the executable neural taxonomy expander comprises generating a respective embedding vector for each of the plurality of nodes of the existing taxonomic hierarchy.

6. The computer-implemented method of claim 5, wherein generating a respective embedding vector for each of the plurality of nodes of the existing taxonomic hierarchy comprises, for each of the plurality of nodes of the existing taxonomic hierarchy:
   aggregating second textual content relating to a current node of the existing taxonomic hierarchy; and
   generating the respective embedding vector of the current node of the existing taxonomic hierarchy according to the aggregated second textual content relating to the current node of the existing taxonomic hierarchy.

7. The computer-implemented method of claim 1, wherein:
   each positive candidate/hypernym pair includes a positive child node and an immediate positive parent node; and
   each negative candidate/hypernym pair includes a negative child node and a hypernym that is not an immediate parent node of the negative child node.

8. The computer-implemented method of claim 7, wherein generating the plurality of candidate/hypernym pairs from the existing taxonomic hierarchy comprises generating a first positive candidate/hypernym pair for each child node in the existing taxonomic hierarchy.

9. The computer-implemented method of claim 8, wherein generating the plurality of candidate/hypernym pairs from the existing taxonomic hierarchy comprises generating a plurality of negative candidate/hypernym pairs for each parent node in the existing taxonomic hierarchy proportional to a number of immediate children of the parent node.

10. A computer-readable medium bearing computer executable instructions which, when executed on a computing system, carry out a method for automatically locating a taxonomy candidate into a taxonomic hierarchy, the method comprising:
   training a neural taxonomy expander according to the taxonomic hierarchy, wherein training the neural taxonomy expander includes:
      generating a plurality of candidate/hypernym pairs, the plurality of candidate/hypernym pairs including positive candidate/hypernym pairs and negative candidate/hypernym pairs;
      subdividing the plurality of candidate/hypernym pairs into a training set and a validation set;
      repeatedly, until a predetermined loss threshold from processing the validation set is met:

training the neural taxonomy expander according to the training set until the predetermined loss threshold is met in processing the training set;

validating the neural taxonomy expander according to the validation set; and updating the neural taxonomy expander according to results of the training upon a determination that the predetermined loss threshold for the validation set is not met; and generating an executable neural taxonomy expander according to the trained neural taxonomy expander;

generating, for each node in the taxonomic hierarchy, a respective embedding vector;

generating a candidate embedding vector of the taxonomy candidate;

projecting the candidate embedding vector of the taxonomy candidate into a taxonomic hyperspace according to the taxonomy projection of the neural taxonomy expander;

identifying a set of closest neighbors in the taxonomic hierarchy to the projected candidate embedding vector of the taxonomy candidate;

determining a closest neighbor of the identified set of closest neighbors as an immediate parent of the taxonomy candidate; and adding the taxonomy candidate into the taxonomic hierarchy as a child node of the determined immediate parent.

11. The computer-readable medium of claim 10, wherein generating the candidate embedding vector of the taxonomy candidate comprises:

aggregating textual content relating to the taxonomy candidate; and generating the candidate embedding vector of the taxonomy candidate according to the aggregated textual content relating to the taxonomy candidate.

12. The computer-readable medium of claim 11, wherein:

each positive candidate/hypernym pair includes a positive child node and an immediate positive parent node; and each negative candidate/hypernym pair includes a negative child node and a hypernym that is not an immediate parent node of the negative child node.

13. The computer-readable medium of claim 12, wherein generating the plurality of candidate/hypernym pairs from the taxonomic hierarchy comprises generating a first positive candidate/hypernym pair for each child node in the taxonomic hierarchy.

14. The computer-readable medium of claim 13, wherein generating the plurality of candidate/hypernym pairs from the taxonomic hierarchy comprises generating a plurality of negative candidate/hypernym pairs for each parent node in the taxonomic hierarchy proportional to a number of immediate children of the parent node.

15. The computer-readable medium of claim 14, wherein generating the embedding vector for each node of the taxonomic hierarchy comprises:

aggregating textual content relating to the node of the taxonomic hierarchy; and generating the embedding vector of the node of the taxonomic hierarchy according to the aggregated textual content relating to the node of the taxonomic hierarchy.

16. A computer system configured to train a neural taxonomy expander to automatically place a taxonomy candidate into an existing taxonomic hierarchy, the computer system comprising a processor and a memory, wherein the processor executes instructions stored in the memory such that execution of the instructions cause the computer system to:

generate a plurality of candidate/hypernym pairs from a taxonomic hierarchy, the plurality of candidate/hypernym pairs including positive candidate/hypernym pairs and negative candidate/hypernym pairs, wherein each positive candidate/hypernym pair includes a positive child node and an immediate positive parent node, and where each negative candidate/hypernym pair includes a negative child node and a hypernym that is not an immediate parent node of the negative child node;

subdivide the plurality of candidate/hypernym pairs into a training set and a validation set;

repeatedly, until a predetermined loss threshold from processing first candidate/hypernym pairs of the validation set is met:

train the neural taxonomy expander according to second candidate/hypernym pairs of the training set until the predetermined loss threshold is met in processing the training set;

validate the neural taxonomy expander according to the first candidate/hypernym pairs in the validation set; and update the neural taxonomy expander according to results of the training upon a determination that the predetermined loss threshold from processing the first candidate/hypernym pairs of the validation set is not met; and generate an executable neural taxonomy expander according to the trained neural taxonomy expander.

17. The computer system of claim 16, wherein in generating the plurality of candidate/hypernym pairs from the taxonomic hierarchy, the computer system generates a first positive candidate/hypernym pair for each child node in the taxonomic hierarchy.

18. The computer system of claim 17, wherein in generating the plurality of candidate/hypernym pairs from the taxonomic hierarchy, the computer system generates a plurality of negative candidate/hypernym pairs for each parent node in the taxonomic hierarchy proportional to a number of immediate children of the parent node.

19. The computer system of claim 18, wherein in determining whether the predetermined loss threshold is met, the computing system is further configured to:

determine a Mean Reciprocal Rank (MRR) for at least some of the plurality of candidate/hypernym pairs; and determine whether the predetermined loss threshold is met in view of the MRR for the at least some of the plurality of candidate/hypernym pairs.

20. The computer system of claim 19, wherein in determining whether the predetermined loss threshold is met, the computing system is further configured to:

determine a Mean Average Precision (MAP) for at least some of the plurality of candidate/hypernym pairs; and determine whether predetermined loss threshold is met in view of the MRR and the MAP for the at least some of the plurality of candidate/hypernym pairs.

* * * * *